Jan. 5, 1960  F. DIESFELD  2,920,220
EDDY CURRENT BRAKE
Filed Oct. 2, 1956  5 Sheets-Sheet 1

INVENTOR
Franz Diesfeld

Jan. 5, 1960   F. DIESFELD   2,920,220
EDDY CURRENT BRAKE
Filed Oct. 2, 1956   5 Sheets-Sheet 2

INVENTOR
Franz Diesfeld

Jan. 5, 1960   F. DIESFELD   2,920,220
EDDY CURRENT BRAKE
Filed Oct. 2, 1956   5 Sheets-Sheet 3
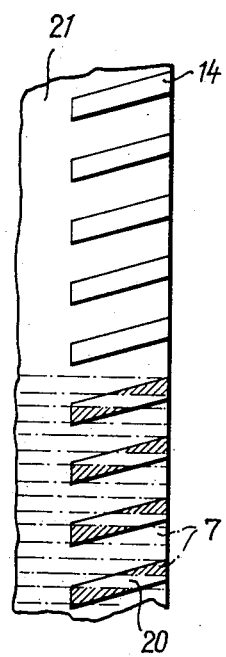
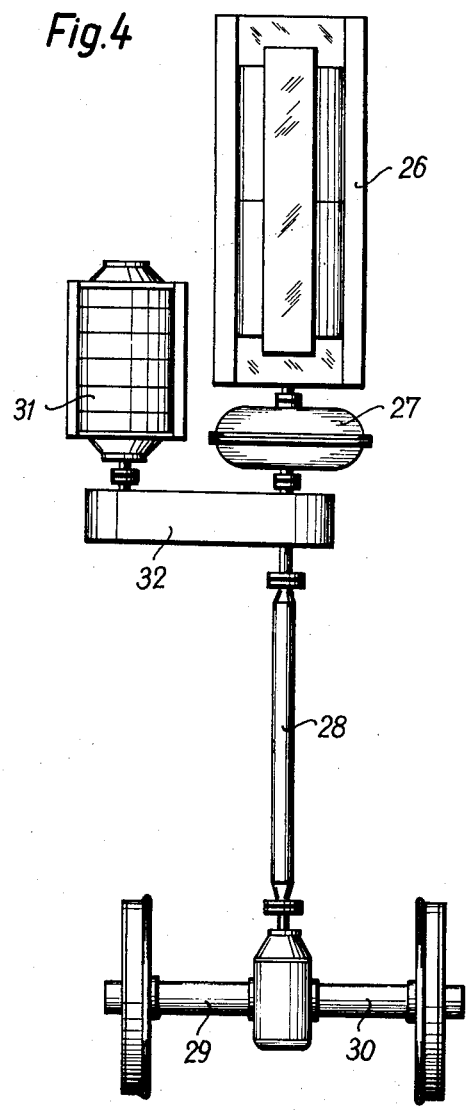
INVENTOR
Franz Diesfeld Jan. 5, 1960 F. DIESFELD 2,920,220
EDDY CURRENT BRAKE
Filed Oct. 2, 1956 5 Sheets-Sheet 4

INVENTOR
Franz Diesfeld

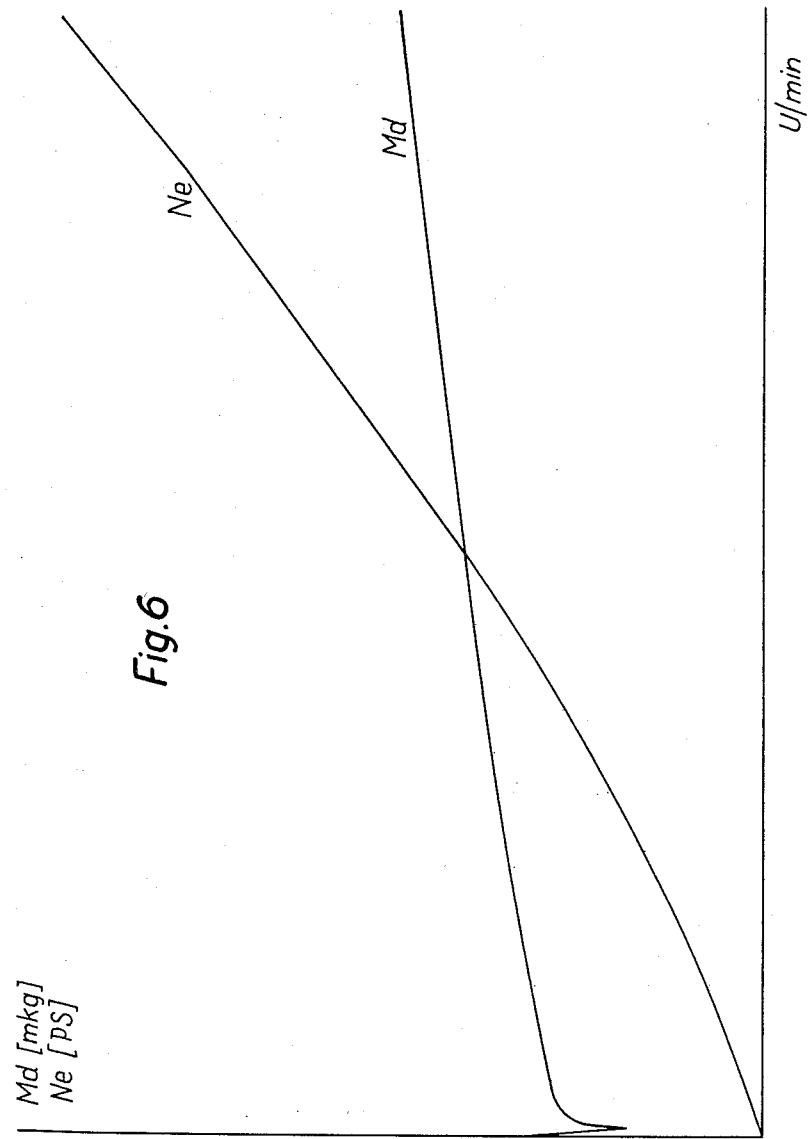

United States Patent Office 2,920,220
Patented Jan. 5, 1960

2,920,220

EDDY CURRENT BRAKE

Franz Diesfeld, Kiel, Germany, assignor to J. P. Sauer & Sohn, Gesellschaft mit Beschraenkter Haftung, Eckernfoerde, Norderschanze, Germany Application October 2, 1956, Serial No. 613,482

5 Claims. (Cl. 310—93)

The present invention relates to an eddy current brake of improved construction.

Eddy current brakes are known, the stator of which consists of one or a plurality of rings arranged coaxially adjacent each other, centered relative to each other, and held together by pressure plates and tensioning bolts, and of annular exciting coils magnetizing the iron always in the same direction, and the rotor of which is provided with teeth having recesses, the center of which is positioned in alignment with the axes of the exciting coils. Likewise known are eddy current wheel brakes, the stator of which is disposed within the rotor, which is provided with cooling surfaces, and which consists of a stationary ring disposed coaxially with the wheel axis and equipped with an annular exciting coil, and which is equipped at its circumference opposite the rotor with axially extending teeth arranged in pairs symmetrically to the exciting coil. In eddy current brakes of this type, axially disposed teeth of the rotor and stator, respectively, are facing the smooth surfaces of likewise axially disposed teeth of the rotor and stator, respectively. The magnetic fields, therefore, pulsate at the spaces between the stator and rotor only in radial direction.

It is, therefore, one object of the present invention to provide an eddy current brake, wherein the pulsation proceeds not only in radial, but simultaneously also in axial direction, since it is most important to achieve a continuous change in the magnetization of the iron.

It is another object of the present invention to provide an eddy current brake, wherein in the stator and in the rotor magnetic isthmens or narrow paths positioned at an angle with respect to each other are provided. The result is that the magnetic fields pass not only in radial direction through the areas in which the eddy currents are created, but also in axial direction from the beginning to the end of the teeth. Hence, there will be in addition to the pulsations a constant shifting in space of the magnetic fields.

It is yet another object of the present invention to provide an eddy current brake, wherein the obliquely positioned teeth of the rotor are so arranged that there is an interval between the end of one tooth and the beginning of the next following tooth.

In cases in which the rotor is not arranged directly at the wheel to be braked and in which a large braking effect has to be produced, the stator rings of approximately T-shaped cross-section are provided with two annular cooling-water channels which are connected with each other by means of a plurality of bores extending in axial direction in close proximity of the inner circumference of the rings, and which are uniformly distributed over the circumference, the cooling water flowing through said bores. The result is that, on the one hand, there are produced between the bores areas for the passage of the magnetic flux of large intensity, acting like axially extending teeth, while, on the other hand, the closed cylindrical inner surface of the stator is retained, which is of utmost importance for the formation of eddy currents. The walls of the cooling water channels, provided with lower inlet openings and upper outlet openings, are formed, on the one hand, by the inner portions of the substantially T-shaped rings, and, on the other hand, by welded sleeves. Furthermore, connecting conduits are provided between the cooling water channels and the cooling water outlets.

It is also a further object of the present invention to provide an eddy current brake, wherein the rotor consists of a hollow cylinder provided with teeth extending in oblique direction to its axis, and due to the fact that because of the increased braking effect correspondingly higher quantities of heat have to be fed off, the rotor is devised like a blower, being closed up at both ends by the ends of the rotor shaft, having an axial bore, and being equipped with packing rings and with splash rings, and is rotatably supported within the pressure plates of the stator in roller bearings, and also has at its periphery bores for the discharge of the air sucked in. Furthermore, the pressure plates of the stator are provided with bores, disposed at the height of the rotor teeth, for the discharge of the air blown against the stator.

In order to keep the dimensions of the eddy current brake as small as possible, it is preferable to arrange a gear which transmits the speed at an increased ratio towards the rotor.

It is also possible to employ the brake in a turning frame.

With these and other objects in view which will become apparent in the following detailed description, the present invention will be clearly understood in connection with the accompanying drawings, in which:

Fig. 3 is an illustration of a partly wound rotor;

Fig. 4 is a diagrammatic illustration showing how the eddy current brake may be arranged in a Diesel locomotive;

Fig. 6 is a diagrammatic illustration showing the braking moment and the actual braking effect in relation with the number of revolutions, the exciting current being constant.

Figure 1:
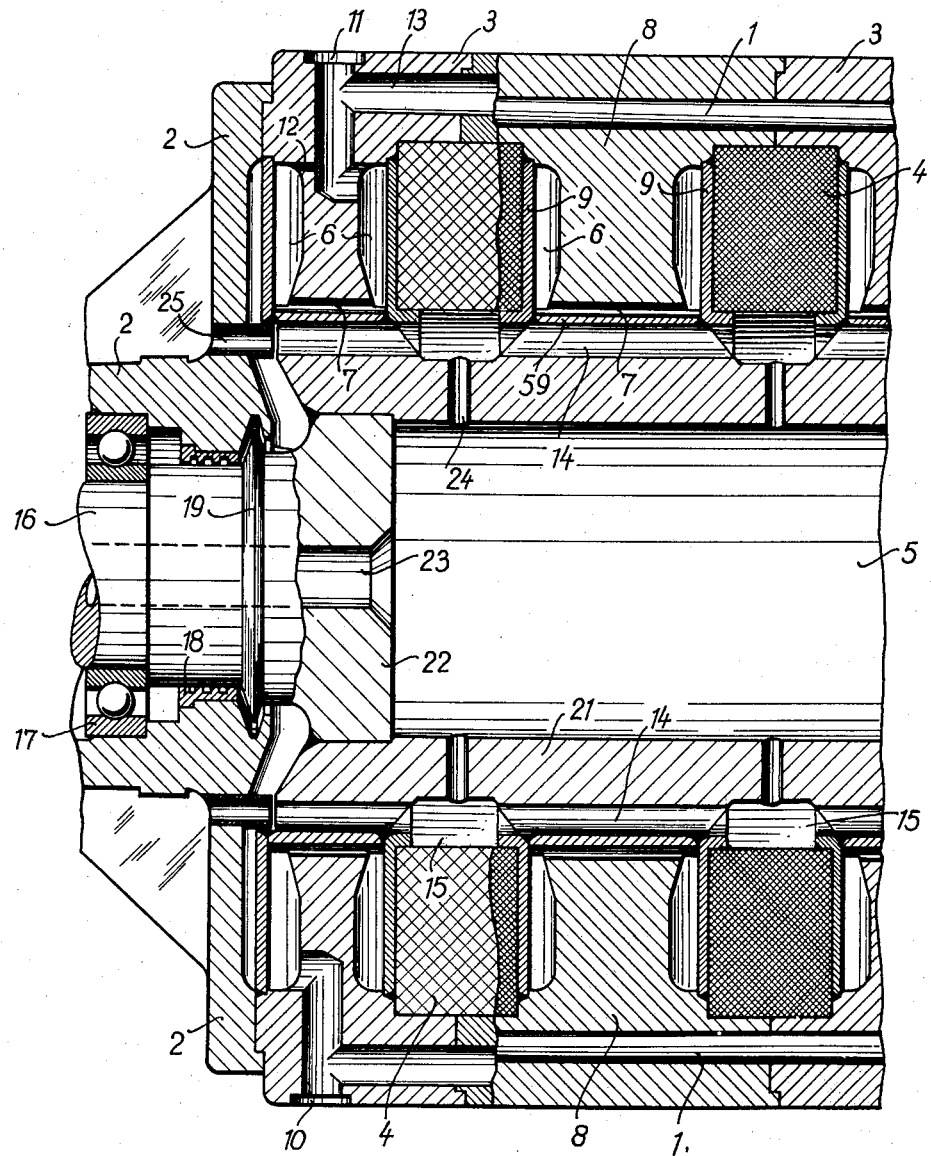
Figure 1 is a fractional axial section of the eddy current brake.
Figure 2:
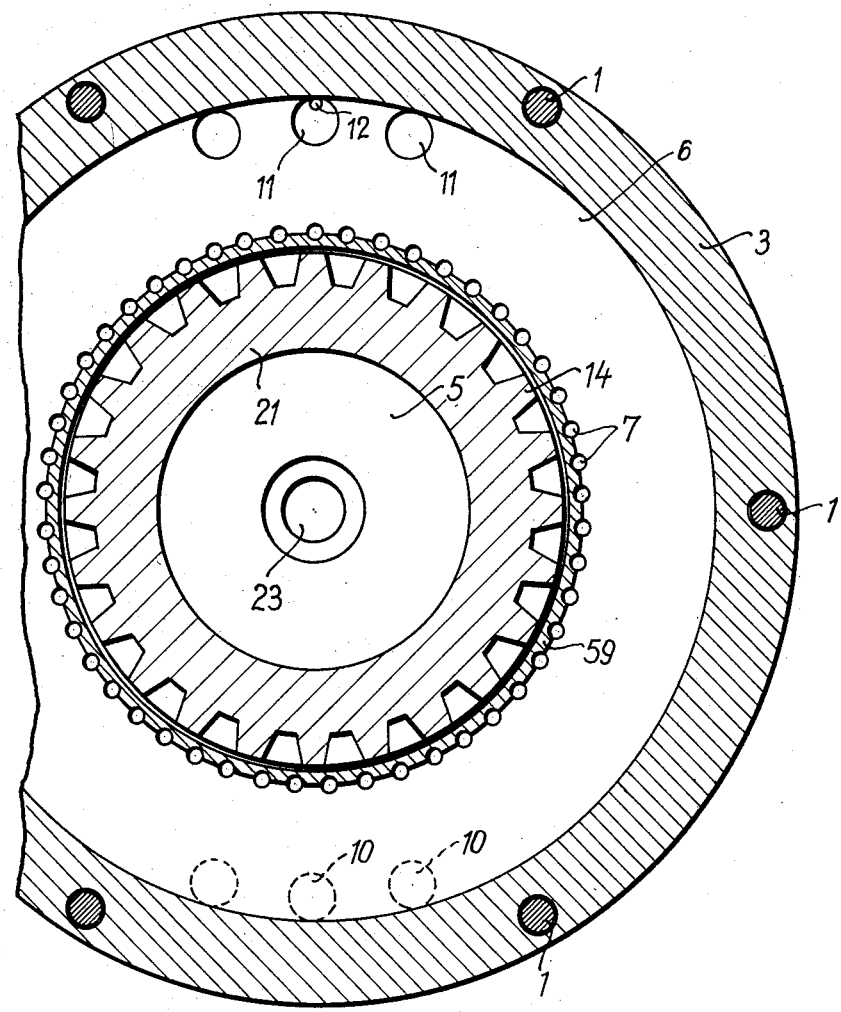
Fig. 2 is a cross-section along the lines 2—2 of Fig. 1.

Referring now to the drawings, a plurality of rings 3 of approximately T-shaped cross section form the stator in which by means of annular coils 4 the magnetic fields in the rotor 5 are produced which are needed for the production of eddy currents in the stator. The rings are secured together by strong pressure plates 2 arranged on both sides and tensioned by means of bolts 1, whereby the rings 3 are coaxially positioned beside one another and centered against one another and provided with connecting channels 13 for feeding cooling water therethrough. For the removal of the heat produced by the eddy currents, the individual stator rings 3 are provided with two annular channels 6 for cooling water, which are connected with each other by means of a plurality of bores 7 extending axially at a small distance from the inner circumference of the rings 3 and distributed uniformly along the circumference, whereby the walls of the annular cooling water channels 6, on the one hand, are constituted by the inner body portions 8 of the approximately T-shaped rings 3, and, on the other hand, by welded-in annular disks 9. For feeding the cooling water thereinto, there are provided in the lower portion of the stator inlet openings 10, and for the discharge of the cooling water, there are provided in the upper portion of the stator discharge openings 11. Short connecting passages 12 between the channels 6 and the outlets 11 serve for the removal of air bubbles which are collecting in the upper portion of the channels 6. The rotor 5 is provided with teeth 14 extending in oblique direction with respect to its axis and with recesses 15 arranged centrally with respect to the exciting coils 4, so that on both sides of the latter poles are formed. The rotor 5 is with its shaft 16 is known manner rotatably supported in roller bearings 17 within the pressure plates 2 of the stator and is protected against the infiltration of oil from the bearings 17 by packing rings 18 and the splash rings 19.

In order to make it possible to reliably cool down the rotor 5 by means of air, it is devised as a hollow cylinder 21 closed up at both of its ends by the shaft stubs 22. The bores 23 in the shaft stubs 22 admit to the interior of the rotor fresh air, which by means of the centrifugal force is blown through the bores 24 into the circumferential wall of the hollow cylinder 21 against the stator, and which after its heating is again discharged into the open air through bores communicating with the conduits 25, which are disposed in the pressure plates 2. In addition, for the heat radiated from the stator to the rotor, the passage conditions to the bearings are not favorable.

In diesel locomotives (Fig. 4), the diesel motor 26 of which acts by means of a liquid gear 27 upon a driving shaft 28 and an angular drive 29 upon the driving axle 30 of the locomotive, the central eddy current brake 31 is connected over a transmission gearing 32 with the shaft 28 to be braked, whereby the speed of the motor is passed on to the brake at an increased ratio.

Figure 5:
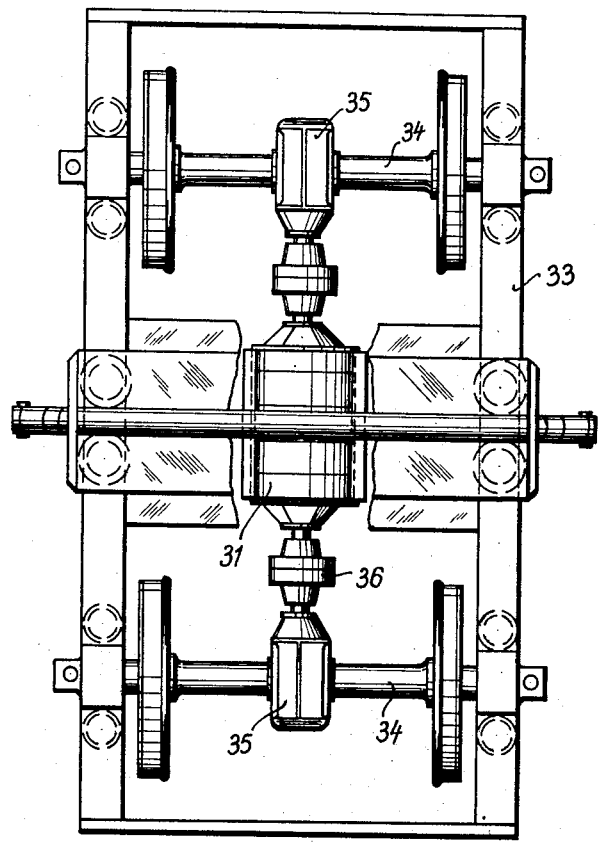
Fig. 5 is a diagrammatic illustration showing how the eddy current brake may be arranged in a turning frame.

In turning frames (Fig. 5), the two axles 34 mounted in the frame 33 are caused to act each over an angular gear 35 and a coupling 36 upon a common eddy current brake 31.

The eddy current brake of the present invention operates as follows:

A coil 4 is arranged in the stator for the excitation of the magnetic field. The braking moment M$d$ is finite at zero revolutions, and then rises in steep ascent up to a point, from where additionally a slightly rising braking moment over the number of revolutions is noticeable. As the actual braking effect is $$N_e = \frac{Md.n}{716.2}$$

if the number of revolutions is high, that is to say, at high speed and large kinetic energy of the vehicle, the braking effect $N_e$ is correspondingly high, while at a smaller number of revolutions, and accordingly also at slower speed and smaller kinetic energy, the braking effect is correspondingly smaller. Hence, the braking effect rises and drops in conformity with the speed and the change of the kinetic energy.

In consideration of the efficiency characteristic, it is advisable to transmit the speed of the wheel axle at an increased ratio to the eddy current brake, in order to be able to employ small-sized braking units.

If the stator is provided with cooling channels 7 positioned in close proximity to the circumference of its inner bore, there will result between these channels or bores 7 areas of the magnetic flux of large intensity (magnetic isthmens) acting essentially like axially extending teeth. They are connected with each other by the thin-walled cylindrical portion 59 adjacent the bore of the stator in which the eddy currents are created. Hence, the advantage of the cooling bores 7 does not merely reside in the effective cooling of the bore of the stator, in which in small depth of the material the eddy currents are transformed in conformity with their surface tendency into heat, but to some extent also in the increase of the frequency of the magnetic flux. For the rotor 5 is provided with oblique teeth and with recesses 15 having their centers arranged in alignment with the axes of the exciting coils 4 by means of which on both sides poles are formed. The result is a rhomboid-like surface 20 (see Fig. 3) from the stator to the rotor of high magnetic density and power of direction with a frequency of the field corresponding to the speed of the rotor in radial direction. Furthermore, the field passes, because of the oblique arrangement of the rotor teeth, in axial direction, whereby an effect is produced comparable to an increase of the speed of the rotor or an increase of the frequency.

The braking effect produced by the eddy current brake of the present invention can, through variation of the exciting current be regulated between nil and a maximum value.

The eddy current brake of the present invention may be employed at stationary plants, vehicles and the like.

Eddy current brakes installed in every car of a railway train can be centrally energized from the locomotive by a direct current generator, and can be controlled by means of an infinitely variable resistance regulation through push button control. It is, however, also possible to provide special current supply means for every car and to effect the control of the brakes of all cars by means of relays operable from the locomotive. A control of the braking plant regarding its fitness for service can at any time be effected from the locomotive through resistance measuring, whereby the resistance per car inclusive of feed line divided by the number of the cars must furnish the total value of resistance when the individual circuits are connected in parallel.

While I have disclosed one embodiment of the present invention, it is to be understood that this embodiment is given by example only and not in a limiting sense, the scope of the present invention being determined by the objects and the claims.

I claim:

1. An eddy current brake comprising a stator and a rotor, both said stator and said rotor having narrow magnetic paths disposed obliquely relative to each other, a closed, very thin, water-cooled and magnetizable cylinder cover forming one end of said magnetic narrow paths of said stator, said magnetic narrow paths being disposed closely to the bore of said stator, said cylinder cover surrounding said rotor over an air space and causing the creation of eddy currents, said rotor having a plurality of teeth, the axis of said teeth being disposed obliquely toward the axis of said rotor, and said teeth being arranged in such manner that a space is formed, measured along the periphery of said rotor, between the end of one of said teeth and the start of the next adjacent of said teeth.

2. The eddy current brake, as set forth in claim 1, wherein said stator comprises a plurality of rings disposed coaxially adjacent each other and centered relative to each other and held together by pressure plates and tension bolts and said stator further comprises a plurality of exciting coils including an iron providing induction of said iron always in the same direction, and wherein said rotor is provided with a plurality of teeth having recesses, and said rings, being of substantially T-cross-section, having two cooling water channels and said stator having a plurality of axially disposed bores arranged adjacent the inner bore of said stator and equally distributed over its periphery, said bores carrying cooling water and connecting said channels, and said rotor comprising a hollow cylinder.

3. The eddy current brake, as set forth in claim 2, wherein said cooling water channels have inlet ports and outlet ports and are disposed in walls formed by narrow portions of said first mentioned rings and additional rings welded thereto, and said stator includes conduits connecting said cooling water channels and said outlet ports.

4. The eddy current brake, as set forth in claim 2, which includes a shaft having end stubs and an axial bore and said shaft being equipped with packing rings and splashing rings and mounted within said pressure plates of said stator in ball bearings, said stubs closing up said hollow cylinder of said stator, and the latter having at its inner periphery a plurality of additional bores communicating with said axial bore of said stubs and wherein said pressure plates of the stator have additional conduits disposed at the level of said teeth of the rotor, for the exhaust of air.

5. The eddy current brake, as set forth in claim 4, which includes a gear drive operatively connected with said shaft.

References Cited in the file of this patent

UNITED STATES PATENTS

| | | |
|---|---|---|
| 683,332 | Robertson | Sept. 24, 1901 |
| 2,073,926 | Fraser | Mar. 16, 1937 |
| 2,197,990 | Winther | Apr. 23, 1940 |
| 2,538,797 | Oetzel | Jan. 23, 1951 |